United States Patent [19]

Mihic

[11] Patent Number: 5,538,368
[45] Date of Patent: Jul. 23, 1996

[54] TOOL HOLDER FOR CLAMPING INSERTS, USING A RESILIENT L-SHAPED CLAMP

[75] Inventor: Wlajko Mihic, Gävle, Sweden

[73] Assignee: Mircona AB, Sweden

[21] Appl. No.: 157,096

[22] PCT Filed: May 27, 1992

[86] PCT No.: PCT/SE92/00359

§ 371 Date: Apr. 18, 1994

§ 102(e) Date: Apr. 18, 1994

[87] PCT Pub. No.: WO92/21466

PCT Pub. Date: Dec. 10, 1992

[30] Foreign Application Priority Data

Jun. 4, 1991 [SE] Sweden .................. 91016907

[51] Int. Cl.⁶ ...................... B23B 29/14; B23B 27/04
[52] U.S. Cl. ...................................................... 407/109
[58] Field of Search ................. 82/160, 161; 407/41, 407/49, 91, 94, 107–109, 50, 95, 110

[56] References Cited

U.S. PATENT DOCUMENTS

| | | | |
|---|---|---|---|
| 1,396,180 | 11/1921 | Fors | 407/107 |
| 1,652,196 | 12/1927 | Delany . | |
| 3,557,417 | 1/1971 | Kollar | 407/112 |
| 3,568,283 | 3/1971 | Wyss | 407/107 |
| 3,808,655 | 5/1974 | Foster | 407/94 |
| 3,837,058 | 9/1974 | Barkley et al. | 407/109 |
| 4,332,513 | 6/1982 | Gowanlock | 407/107 |
| 4,545,705 | 10/1985 | Benson | 407/108 |

FOREIGN PATENT DOCUMENTS

| | | |
|---|---|---|
| 2548870 | 10/1980 | Germany . |
| 3434089 | 3/1986 | Germany . |
| 19851 | 8/1909 | United Kingdom . |
| 1370035 | 9/1972 | United Kingdom . |
| 1402946 | 5/1973 | United Kingdom . |

OTHER PUBLICATIONS

Perspective drawings of the known devices identified on p. 1, lines 8–23 of Serial No. 08/157,096.

*Primary Examiner*—M. Rachuba
*Assistant Examiner*—Kenneth J. Hansen
*Attorney, Agent, or Firm*—Ware, Fressola, Van der Sluys & Adolphson

[57] ABSTRACT

Tool holder device has an elongated main body presenting a rearwardly extending back portion (2) to be received inside a turret body groove and locked therein by means of wedge means and a forwardly extending portion (3) having an obliquely arranged abutment surface (4) and an outwardly facing surface (5) defining a seat for the insert tool holder. The adjoining surface (6) of the main body having an elongated groove (7) having parallel walls also in parallel with the outwardly facing surface and a bottom perpendicular to same surface and in an intermediary position a number of threaded bores (8) extending essentially in parallel with the outwardly facing surface (5). The groove being adapted to receive two or more L-shaped clamping pieces (9) having one leg (10) with an end portion with a thickness corresponding to the width of the main body elongated groove (7) and another leg (11) having an abutment surface (12) for engaging the insert holder. Each clamping piece (9) includes through bores (13) for screws essentially in parallel with the leg 10 and an adjoining abutment surface for the screw head. The clamping piece in a transition portion (15) between its two legs having a mutual bending facilitating recess or groove (16).

8 Claims, 1 Drawing Sheet

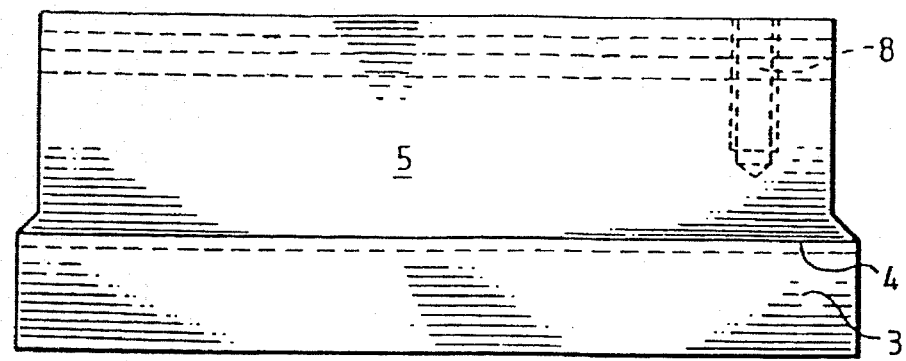
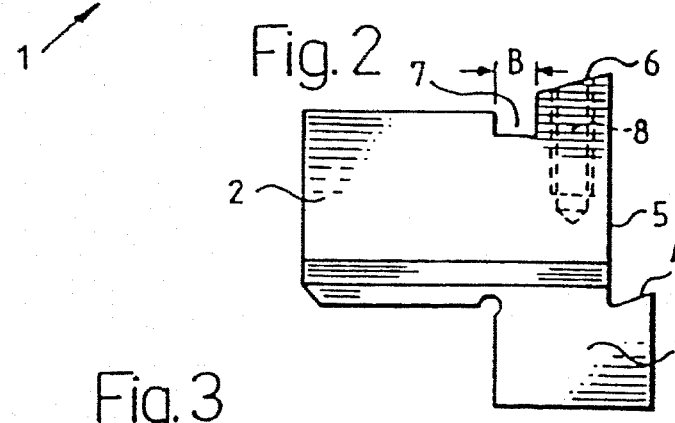
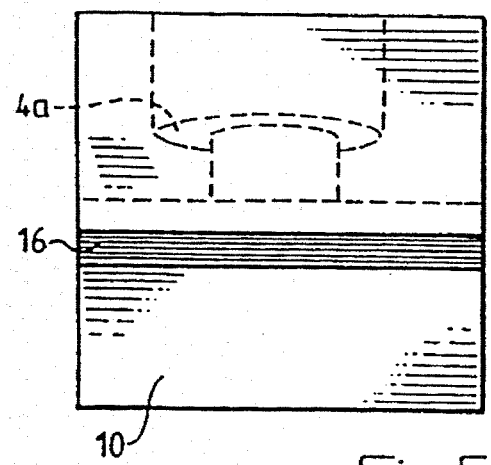
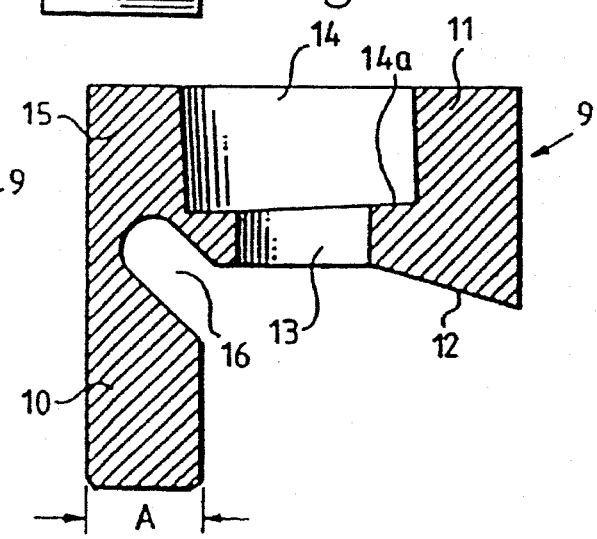
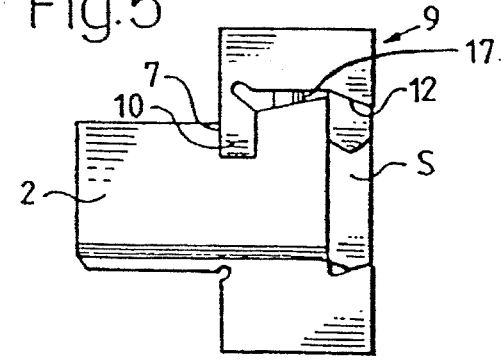

TOOL HOLDER FOR CLAMPING INSERTS, USING A RESILIENT L-SHAPED CLAMP

BACKGROUND OF THE INVENTION

1. Technical Field of the Invention

This invention relates to a tool holder or clamping piece for insert holders, and, more particularly, to a tool holder is clamped in a seat at the turret with the insert holder which in the tool holder.

2. Description of the Prior Art

A known clamping piece or tool holder has a base part with abutments for clamping wedges and screws for securing the base part in grooves at the turret body. A carrier piece for the tool or insert holder which later piece as also the base piece has complementary guiding and positioning portions, on securing the pieces to each other engaging each other and localizing the parts as well as at the carrier piece arranged setable and adjustable guides for clamping bodies pressing the tool holder towards an abutment.

Another known device includes a tool holder made in one piece with a rear protruding portion intended to be wedged inside the turret body groove and having an elongated clamping rail intended to secure the tool holder by means of screws passing through holes in the rail and inserted into the holder body. A opposite edge of the holder abutting a seat on the holder.

DE, A1 3 434 089 and GB, B 19851/1909 disclose arrangements for securing parting tool holders and tools by means of an essentially L-shaped clamping piece one leg of which rests in an elongated groove at the base part whereas the other leg engages a tool holder or tool in order to press same against a seat when pressed towards the base part by means of one or more screws. The former publication also reveals a weakening slot made in the leg of the clamping piece engaging the elongated groove to facilitate the movement of the other leg towards the tool holder. The later publication discloses a rigid L-shaped clamping piece. Upon turning the screw, the clamping piece is swung around an axis at the line of engagement along the base part groove. The corresponding axis of the weakened leg clamping piece follows the bottom of the weakening groove. The positioning of the axes below a plane perpendicular to the plane of the tool holder and passing the point or line of engagement at the free edge of the tool holder implies that any force exerted towards the tool holder engaging leg of the clamping piece will result in a division of the force acting against the tool holder edge in one component acting in the plane of the tool holder and one component pushing outwardly so as to remove the holder from its seat.

DE, B2 2 548 870 and U.S. Pat. No. 4,545,705 disclose arrangements similar to the one shown in GB, B 19851, i.e. clamping pieces having one leg resting in a groove and the other leg engaging a tool holder or tool. In all cases, the clamping piece swings around an axis situated well below a plane through the upper edge of the tool or tool holder.

SUMMARY OF THE INVENTION

An object of the present invention is to provide a novel tool holder having a simple construction and easily manufactured without complicated machining and the like. Another object is to fulfill a long felt need of facilitating the change of tool holders without necessitating dismantling of a multitude of pieces.

Still another object is to provide such a tool holder device arranged with the contact directions of the clamp piece securing as stable as possible a clamping of the tool holder.

The tool holder according to this invention includes an elongated main part having a rearwardly extending back portion insertable into the turret body recess and a forwardly protruding portion. The forwardly protruding portion having an obliquely located abutment surface together with a joining outwardly facing surface for positioning the insert holder. The opposite edge of the outwardly facing surface is joined with a backwardly obliquely arranged surface in turn passing into an elongated groove. The elongated groove having parallel walls also parallel with the outwardly facing surface and a bottom at right angles with the outwardly facing surface. The portion of the main port having the rearwardly obliquely arranged surface includes a number of threaded bores which are essentially parallel with the outwardly facing surface.

At the main part, there are mountable two or more essentially L-shaped clamping pieces. Each clamping piece having a non significant length dimension and having first leg with one end portion having a thickness closely corresponding to the width of the elongated groove in the main part and second leg having an oblique inner abutment face. Each clamping piece also having at least one through hole essentially parallel with the first leg and having an adjoining abutment surface for the head of a screw which surface is obliquely arranged so that a screw passed through the bore and into one of the threaded bores in the main part will engage essentially only at the portion of the abutment surface closest to the leg end having the obliquely arranged surface.

The clamping pieces have at the transition where the two legs are joined a recess facilitating the bending of the material.

BRIEF DESCRIPTION OF THE DRAWINGS

One preferred embodiment of the device according to this invention will be described in detail with reference to the accompanying drawing, in which FIG. 1 is a side elevational view of the tool holder main part as seen from the outside, FIG. 2 is an end elevational view of the main part, FIG. 3 is a front elevational view of a clamping piece, FIG. 4 is a cross sectional view of the clamping piece, and FIG. 5 is an end elevational view of the clamping piece mounted on the main part with an insert holder held thereby.

DETAILED DESCRIPTION OF THE INVENTION

The main part, i.e. the tool holder 1, is formed of a piece of steel through milling or the like machining to a given specific shape.

The part 1 includes at the rear end, i.e. on the side which, in mounted position, will be facing the turret body, an elongated extending portion 2 forming a specific portion to be inserted into a groove (not shown) in the turret body (not shown) and secured therein by well known wedging means (not shown) inserted between the extending portion and the opposite wall of the groove.

The front side of the main part 1 has at the lower portion thereof an elongated projection 3 having a downwardly and inwardly inclined upper edge 4 serving as an abutment for an insert holder S (FIG. 5) placed thereon. A front face 5 adjoins upper edge 4 and defines together with it two sides of a seat for the insert holder S. The front face 5 changes over into a rearwardly and downwardly inclined surface 6 which inclines towards a longitudinal groove 7 arranged in the upwardly facing side of the main part 1. The groove has sides parallel with the front face 5 and a bottom essentially at right angles with the sides. The main part 1 also includes at least two threaded bores 8 (only one shown) extending essentially parallel with the front side 5 from the inclined surface 6.

To the main part 1 are attached at least two clamping pieces designated 9. Each clamping piece is an inverted essentially L-shaped piece of material having insignificant length and preferrably manufactured by machining rod material into desired sectional shape and subsequent cutting in needed lengths.

Each clamping piece 9 has a downwardly directed first leg 10 having a thickness A closely corresponding with the width B of the longitudinal groove 7. The engagement between the first leg 10 and the groove ensures a secure positioning of the clamping piece 9.

A second leg 11 extends from the first leg 10 and has at the underside of its outer end an obliquely arranged surface 12 which serves as contact surface for the insert holder S and also presents a bore 13 essentially parallel with the first leg 10. The bore 13 is connected to a counter sunk seat or abutment portion 14 for receiving the head of a screw (not shown) which is threaded through the bore 13 into any one of the threaded bores 8 of the main part 1. This counter sunk seat 14 is obliquely arranged so that a portion 14a thereof adjacent an outer end of the second leg 11 is higher and consequently will meet the head of the screw first and serve as abutment for the same.

In a transition portion 15 between the two legs 10 and 11 there is an obliquely arranged recess or slot 16 which gives to the two legs a mutual mobility.

After securing the main part 1 of the tool holder in a known way in the turret body groove, the insert holder S can be mounted therein. This takes place by placing the insert holder S with the lower side thereof towards the lower obliquely arranged edge 4 and engaging the front surface 5. Each clamping piece 9 is secured in desired position aligned with one of the bores 8 by inserting its first leg 10 into the groove 7 and threading its associated screw 17 (FIG. 5) into the bore. As soon as a screw head reaches the front portion 14a of the counter sunk seat 14, the upper leg 11 will deflect via the transition portion 15 between the two legs whereby the obliquely arranged surface 12 will contact the insert holder S and press the same downwardly towards the opposite abutment 4 and simultaneously inwardly towards the surface 5. The more the screw 17 is tensioned, the more the leg 11 will deflect downwardly. To permit this movement, the bore 13 for the screw is so shaped that the screw shaft will run freely therethrough even if the upper leg 11 is deflect of its original position.

By arranging a recess 16 in the transition portion 15 between the two legs 10 and 11, there is achieved a hinge function. The pivot axis thereof will be situated at a rather high level and this results in an efficient pressing action towards the insert holder S. This is the result of the lever relations existing where the fulcrum of the one armed lever, i.e. the transition portion 15, will be situated higher than a normal plane perpendicular to the upper edge of the insert holder and the contact surface 12 at the end of the leg 11. The force resulting from the lightening of the screw 17 and acting at the contact point between the end of the leg 11 and the insert holder S may be divided in one component parallel with the plane of the insert holder S and the front face 5 and one inwardly directed component perpendicular thereto. Consequently, on tightening the screws, the insert holder S will be pressed downwardly towards the abutment surface 4 and simultaneously against the front face 5 of the main part 1.

The invention is not restricted to the above described embodiment but may be modified within the scope of the attached claims.

I claim:

1. A tool holder for receiving an insert holder, the tool holder comprising:

(a) a main part providing a seat for an insert holder including one rigid abutment surface for engaging a first surface of the insert holder and a lateral abutment surface for engaging a second surface of the insert holder, said main part is provided with an elongated groove spaced from said seat and, along said elongated groove, a plurality of bores dimensionally sized for receiving force applying screws;

(b) at least one clamping piece engageable with a third surface of the insert holder opposite the first surface, said at least one clamping piece being substantially L-shaped having a first leg, a second leg and a transition portion between said first and second legs, said first leg rigidly received in said elongated groove, said second leg having a bore for a force applying screw and a free end presenting a contact surface for the third surface of the insert holder, said transition portion having a bend enhancing recess defined therein to enhance mutual bendability of said first and second legs relative to each other, said bore for a force applying screw in said second leg having a surrounding counter sunk seat intended to form an abutment for a head arranged on a force applying screw, said counter sunk seat being inclined relative to a center axis of said bore for a force applying screw in order to allow concentration of force from a force applying screw on a portion of said counter sunk seat adjacent said free end of said second leg presenting said contact surface; and (c) a force applying screw extending through said bore to engage one of said plurality of bores, said force applying screw having a head engaging said counter sunk seat whereby, upon tightening of said force applying screw, said second leg deflects at said transition portion so that said contact surface engages the third surface of the insert holder with a force acting both towards said rigid abutment surface and towards said lateral abutment surface.

2. The tool holder according to claim 1, wherein said counter sunk seat is obliquely arranged relatively to a center axis of said bore for said force applying screw so that said portion thereof adjacent said free end of said second leg initially engages said head of said force applying screw as said force applying screw is tightened.

3. The tool holder according to claim 2, wherein said contact surface of said second leg for engaging the third surface of the insert holder is obliquely arranged.

4. The tool holder according to claim 1, wherein said contact surface of said second leg for engaging the third surface of the insert holder is obliquely arranged.

5. A tool holder according to claim 1, wherein said contact surface and said transition portion with said bend enhancing recess of said at least one clamping piece are relatively positioned to create an effective bending fulcrum for said second leg situated to produce the force acting both towards said rigid abutment surface and towards said lateral abutment surface.

6. A tool holder according to claim 1, wherein said counter sunk seat is obliquely arranged relative to said center axis of said bore for said force applying screw so that said portion of said counter sunk seat which receives the concentration of force from said force applying screw is higher than remaining portions of said counter sunk seat and contacts said force applying screw first to provide an abutment for said force applying screw.

7. A tool holder according to claim 1, wherein said portion of said counter sunk seat which receives the concentration of force from said force applying screw is located between said center axis of said bore for said force applying screw and said free end of said second leg presenting said contact surface.

8. A tool holder according to claim 1, wherein said insert holder corresponds in thickness to said rigid abutment surface of said main part.

* * * * *

UNITED STATES PATENT AND TRADEMARK OFFICE
CERTIFICATE OF CORRECTION

PATENT NO. : 5,538,368
DATED : July 23, 1996
INVENTOR(S) : Wlajko Mihic

It is certified that error appears in the above-indentified patent and that said Letters Patent is hereby corrected as shown below:

Col. 1, line 9, the first comma should be deleted.

Col. 1, line 9, after "holder", --which-- should be inserted.

Col. 1, line 10, "which" should be deleted.

Col. 1, line 28, "A" should be "An".

Col. 2, line 46, "cross sectional" should be --cross-sectional--.

Col. 2, line 63, after "has", --,-- should be inserted.

Col. 2, line 65, after "thereof", --,-- should be inserted.

Col. 3, line 20, after "groove", --7-- should be inserted.

Col. 3, line 34, after "11", --,-- should be inserted.

Col. 3, line 47, "upper" should be --second--.

Col. 3, line 54, after "screw", --17-- should be inserted.

Col. 3, line 65, after "holder", --S-- should be inserted.

Signed and Sealed this

Twelfth Day of November, 1996

Attest:

BRUCE LEHMAN

*Attesting Officer*　　*Commissioner of Patents and Trademarks*